United States Patent [19]

Laudenslager et al.

[11] Patent Number: 4,677,636
[45] Date of Patent: Jun. 30, 1987

[54] MULTIPLEX ELECTRIC DISCHARGE GAS LASER SYSTEM

[75] Inventors: James B. Laudenslager, Sierra Madre; Thomas J. Pacala, La Canada, both of Calif.

[73] Assignee: The United States of America as represented by the Administrator of the National Aeronautics and Space Administration, Washington, D.C.

[21] Appl. No.: 790,594

[22] Filed: Oct. 23, 1985

[51] Int. Cl.⁴ .................... H01S 3/14; H01S 3/097
[52] U.S. Cl. .................................... 372/68; 372/81
[58] Field of Search ................... 372/68, 81, 25, 93

[56] References Cited

U.S. PATENT DOCUMENTS

| | | | |
|---|---|---|---|
| 3,378,446 | 4/1968 | Whittlesey | 219/121 |
| 3,404,253 | 10/1968 | Anderson et al. | 219/121 |
| 3,571,554 | 5/1971 | Baujoin et al. | 219/121 |
| 3,935,419 | 1/1976 | Lambert et al. | 219/121 |
| 3,995,136 | 11/1976 | Steiger et al. | 219/121 |
| 4,200,846 | 4/1980 | Stark, Jr. et al. | 372/81 |
| 4,230,993 | 10/1980 | Cirri | 372/81 |

Primary Examiner—Gene Wan
Attorney, Agent, or Firm—Paul F. McCaul; John R. Manning; Thomas H. Jones

[57] ABSTRACT

A multiple pulse electric discharge gas laser system is described in which a plurality of pulsed electric discharge gas lasers are supported in a common housing. Each laser is supplied with excitation pulses from a separate power supply. A controller, which may be a microprocessor, is connected to each power supply for controlling the application of excitation pulses to each laser so that the lasers can be fired simultaneously or in any desired sequence. The output light beams from the individual lasers may be combined or utilized independently, depending upon the desired application. The individual lasers may include multiple pairs of discharge electrodes with a separate power supply connected across each electrode pair so that multiple light output beams can be generated from a single laser tube and combined or utilized separately.

16 Claims, 8 Drawing Figures

MULTIPLEX ELECTRIC DISCHARGE GAS LASER SYSTEM

BACKGROUND OF THE INVENTION

1. Origin of the Invention

The invention described herein was made in the performance of work under a NASA Contract and is subject to the provisions of Section 305 of the National Aeronautics and Space Act of 1958, Public Law 85-568 (72 STAT 435; 43 USC 2457).

2. Field of the Invention

This invention relates to electric discharge gas lasers and, more particularly, to a system incorporating a plurality of pulsed electric discharge gas lasers.

3. Brief Description of the Prior Art

U.S. Pat. Nos. 4,088,965 and 4,275,317 and U.S. patent application Ser. No. 727,931, filed Apr. 29, 1985, entitled "Magnetically Switched Power Supply System for Lasers," assigned to the assignee of the present application, describe high-power electric discharge gas lasers, power supplies and transmission lines for supplying excitation energy to such lasers. The technology disclosed in the patents and application permit more reliable operation with lower system costs at higher average power, higher pulse energies and higher repetition rates than theretofore possible. However, there are practical limiting factors to the power and repetition rate achievable with a laser in a commercial environment.

Specific areas of concern in designing a laser, such as a rare gas excimer laser, for providing high pulse and average power include: (1) the physical size of the laser; (2) the need for high voltage pulsed power supply to scale a single device to high pulse energy; (3) the high speed recirculation of a self-contained gas mixture in order to operate at high repetition rates; (4) the need to have large, expensive optical elements for transmitting and directing the laser beams from a large scale excimer laser; and (5) component lifetime.

The prior art has demonstrated that efficient lasing on a variety of excimer gas mixtures, i.e., xenon chloride (XeCl), krypton fluorine (KrF), argon fluorine (ArF), etc., can be obtained at a maximum specific output energy density in the range of 0.5 to 1.5 Joules per liter-atmosphere. Therefore, to scale the energy per pulse from a single laser to the multiple Joule/pulse level, the discharge volume and/or the pressure has to be increased. Increasing the laser discharge volume and pressure requires an increase of the gas breakdown and sustained discharge voltage necessary to excite the laser (e.g., the breakdown voltage is approximately three to five times the sustained discharge voltage). For example, a $5 \times 5 \times 50$ cubic centimeter ($cm^3$) discharge volume XeCl laser at five atmospheres ("atm") producing five Joules per pluse has a breakdown voltage of about 75 kilovolts ("kV") and sustained discharge voltage of about 30 kV with a helium buffered gas mix and about 60 kV breakdown voltage and a 20 kV sustained discharge voltage with a Neon buffer. To scale a XeCl laser to produce about 14 Joule/pulse would require a discharge volume of about $7 \times 7 \times 80$ $cm^3$, a breakdown voltage of about 125 kV and a sustained voltage of about 40 kV for a buffered XeCl gas mix. Further extensions of the output pulse energy from an excimer laser would require even larger discharge volumes, higher voltages and energy, as well as larger optics.

The problem of providing adequate gas flow within an excimer laser to enable high average power operation, without the loss of optical beam quality and pulse energy, also becomes more aggravated as the firing or repetition rate is increased. Since electric discharge gas excimer lasers have low efficiencies, i.e., 1-4%, most of the discharge energy goes into heating of the gas mixture. In most cases, this heat must be removed from the recirculating gas mixture to maintain efficient laser operation. Also, where high repetition rates are to be encountered, the flow system must be carefully designed to provide efficient gas exchange (several clearings of the discharge region between laser pulses) and to control flow turbulence and discharge acoustic shock waves. Flow disturbances cause density gradients in the gas flow which can severely degrade the optical beam quality as well as the energy output from the laser. Increasing the repetition rate and average power in a laser requires a higher gas flow velocity to maintain the same flush factor through the electrodes and a larger heat exchanger to remove the excess heat from the gas. The flow turbulence and acoustic waves increase with higher gas flow rates and increased energy loadings.

In addition to the above problems, the replacement of power supply componenets becomes an increasing problem as the repetition rate is increased. While the saturable inductor switches described in U.S. Pat. No. 4,275,317 have an almost unlimited life, other power supply components do not. Primary switches such as thyratrons have lifetimes of the order of $-10^9$ shots, capacitors and laser electrodes have similar lifetime restrictions due to the number of accumulated discharge cycles. When the pulse rate is increased, the operational lifetime of these electrical components becomes shorter, so replacement and maintenance schedules are shorter and there is more frequent down time for the laser.

A single excimer laser designed to provide high average power at high repetition rate operation will not only result in a complex, expensive device that is costly to maintain, but also in a device which is not suited for many practical applications. A variety of applications require not raw energy from the laser, but energy in a particular form, e.g., a particular wavelength; a certain repetition rate or pulse sequence, either high peak power or the same pulse energy but in a longer pulse width. The single high energy laser design limits the applicability of the laser to only a few specific tasks.

For example, a single excimer laser has maximum output pulse width limited to the nanosecond ("ns") range (e.g., 10–1000 ns) because all of the halogen donor reacts in this time period. Applications such as metal welding may require pulsewidths of many microseconds ($\mu s$) to effectively heat and melt the surrounding area. Other applications such as solar cell annealing appear to require a high energy short duration pulse (50 ns) from a laser in the ultraviolet wavelength. A typical solar cell has an area of 100 $cm^2$ and therefore requires a 150 Joules/pulse excimer laser output with a beam cross section of 10 cm $\times$ 10 cm and pulsewidth of about 50 ns to anneal the cell with a single pulse. To achieve this from a single laser would present an extremely difficult engineering challenge.

While the prior art has proposed the use of several lasers to overcome the limitations of solid state (e.g., ruby laser) or $CO_2$ laser devices instead of a single laser for specific applications, such prior art devices have not overcome the above problems. For example, U.S. Pat. No. 4,230,993 discloses several series-connected lasers excited by a common power supply and focused on a common point for providing a higher level of energy per pulse or a higher pulse repetition rate. The use of a single power supply for high repetition rate operation has the disadvantages discussed above; i.e., short lifetime for the electrical components and a frequent replacement and maintenance schedule. Also, the use of a single power supply which is alternately connected to the lasers limits the time between laser firings to accommodate the charge built up in the energy storage devices, such as capacitors. This precludes the use of such a system in an application where a long continuous pulse is required; e.g., in welding metal, as discussed above. Further, the use of a series connection and a common focus point for the lasers severely limits the versatility of the system. Recent experiments in material ablation indicate that only a small specific energy is absorbed in cutting certain material such as leather and biological tissue. Increasing the laser energy does not necessarily increase the cutting rate. Focusing several single lasers at a common point, as is described in U.S. Pat. No. 4,230,993, will not increase the cutting rate for such material. Increasing the individual repetition rate may increase the cutting rate, but only at increased cost and decreased time between maintenance.

The above shortcomings of the prior art lasers are overcome by the present invention.

SUMMARY OF THE INVENTION

It is an object of the present invention to provide a laser system, including a plurality of lasers which can be fired in any combination and at one or more targets to provide optical output pulses having a time duration, power per pulse or repetition rate which is greater than that available from one of the lasers.

In accordance with the present invention, a multiple-pulsed electric discharge gas laser system is provided which comprises a housing and a plurality of pulsed electric discharge gas lasers preferably of the rare gas excimer type supported therein. A high voltage pulsed power supply is individually associated with each laser to supply excitation pulses to the respective laser and cause it to produce a pulse of light of a predetermined duration. A controller such as a microprocessor is connected to each power supply for controlling the application of excitation pulses to each laser whereby the lasers can be fired simultaneously or in any desired sequence and at a desired repetition rate with a combined beam or multple beams, depending on the desired application.

If desired, two or more pairs of discharge electrodes may be included in a single laser tube, each pair of electrodes being supplied excitation energy from a separate power supply. This permits two or more optical output pulses to be supplied from a single tube. The individual pairs of electrodes can be controlled to provide simultaneous or sequential output pulses.

DETAILED DESCRIPTION OF THE DRAWINGS

Figures 1, 2:
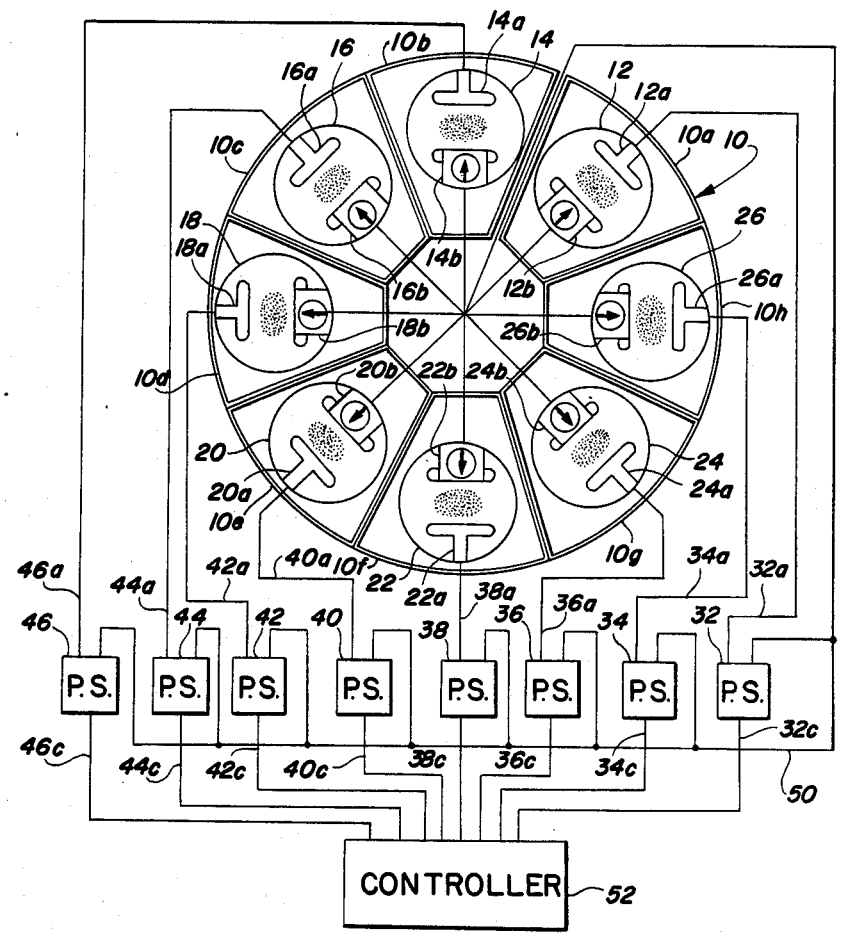
FIG. 1 is a schematic representation of a multiple electric discharge gas laser system in accordance with the present invention.
FIG. 2 is a schematic representation of a power supply that may be used in the system of FIG. 1.

Referring now to the drawings, and more particularly to FIG. 1, there is illustrated a multiplex electric discharge gas laser system in accordance with the present invention, including a housing 10 and eight individual electric discharge gas lasers of the excimer type supported in the housing. The lasers are designated by the numerals 12, 14, 16, 18, 20, 22, 24 and 26. The housing 10 comprises individual modules (10a–10h), each of which supports a separate laser, as illustrated. The individual modules may be positioned in parallel (as shown) or series, as desired.

Excitation energy is supplied to the lasers by individual power supplies 32, 34, 36, 38, 40, 42, 44 and 46, as illustrated. Each laser includes a high voltage electrode designated by the letter "a" and a ground electrode designated by the letter "b". For example, the high voltage and ground electrodes for the laser 12 are designated by 12a and 12b, respectively, as shown in the drawing. The electrodes are of the transverse type and extend the length of the lasers, as is well known in the art.

Each high voltage electrode 12a, etc., is connected to the high voltage lead of its associated pulsed power supply (designated by the letter "a" and preceded by the numeral identifying the power supply, as shown). The ground electrodes of each of the lasers are connected to the common ground bus 50 of each of the power supplies, as shown. The high voltage lead and ground lead constitute a high voltage output circuit of the power supplies. Each power supply also includes a control input circuit designated by the letter "c" preceded by the numeral identifying the power supply, as shown. Each control input circuit is connected to a common controller or microprocessor 52. For example, the control input circuit for the power supply 32 is designated as 32a, etc.

Referring now to FIG. 2, there is illustrated a schematic diagram of a power supply 32 that may be used for the power supplies 32–46 in FIG. 1. The power supply 32 of FIG. 2 includes a source of direct current (dc) 54 and a charge storage device or capacitor 56 connected across the dc source 54. A starting switch 58, which may be in the form of a thyratron or solid state switch, is connected in series between the dc source 54 and a pulse forming network 60. A charge storage device or capacitor 62 serves to store the pulse output from the pulse forming network 60. A saturable inductor switch 64, of the type described in U.S. Pat. No. 4,275,317, and an additional capacitor 65 apply excitation energy to the laser 12 in the manner described in U.S. Pat. No. 4,275,317 to pump the laser 12 and cause it to produce an optical or light output pulse.

The electrical excitation pulses from the power supply 32 are controlled by the activation of the starting switch 58 which in turn is controlled by the application of control signals on lead 32c from the controller 52. Each control signal applied to the control lead 32c–46c causes the respective power supply to apply an excitation pulse to the respective laser. The control signals from the controller need only be a high level (or low level) digital signal sufficient to cause the starting switch 58 to close, as is well known in the art.

Figure 3:
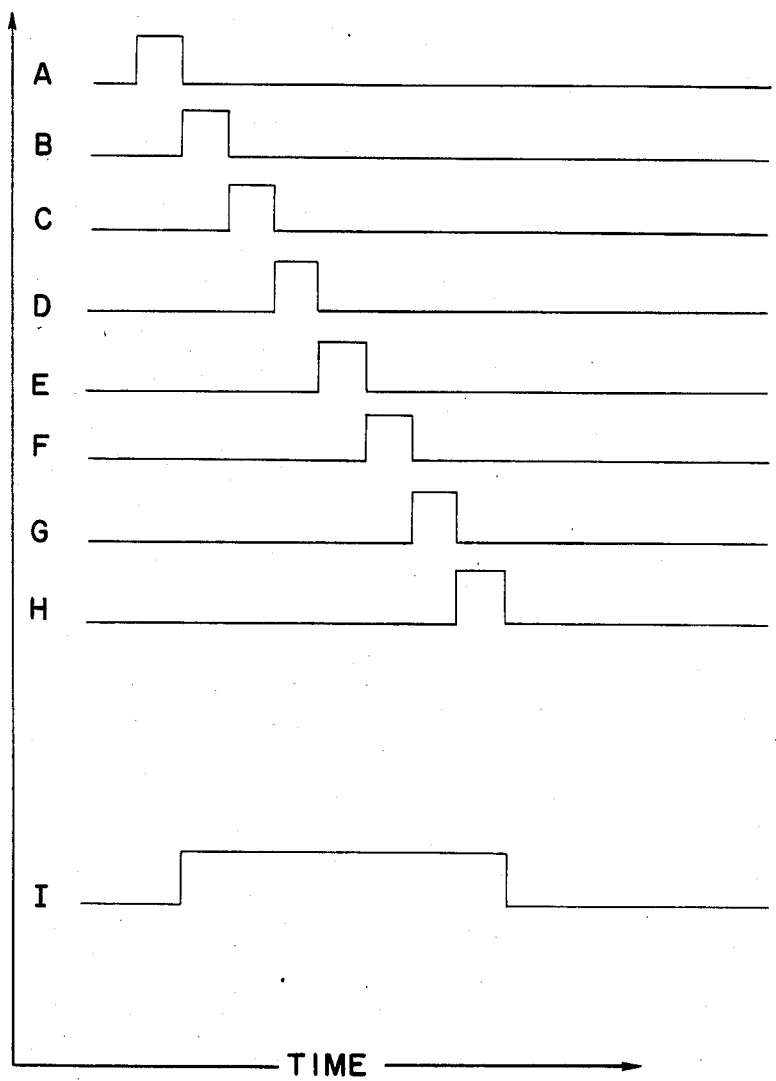
FIG. 3 is a diagram illustrating the optical output from the individual lasers and from the system of FIG. 1 when the individual lasers are fired in sequence to provide coincidence between the termination of one laser firing and the beginning of the next laser firing.

Referring now to FIG. 3, there is illustrated the optical output waveforms A, B, C, D, E, F, G and H from the individual lasers 12, 14, 16, 18, 20, 22, 24 and 26, respectively, when the controller 52 is arranged to cause lasers 12–26 to fire sequentially so the termination of one laser firing coincides with the beginning of the next laser firing. Waveform I on FIG. 3 represents the optical output of the system (combined lasers). Such an operation of the laser system of FIG. 1 would be highly desirable in welding operations. For example, an output pulse width of each laser of the order of 125 ns will provide a combined output pulse width of 1 $\mu$s. Such a long duration pulse may be necessary to effectively heat and melt the surrounding area in a welding operation. Another application for the system operation illustrated in FIG. 3 is the annealing of solar cells.

Figure 4:
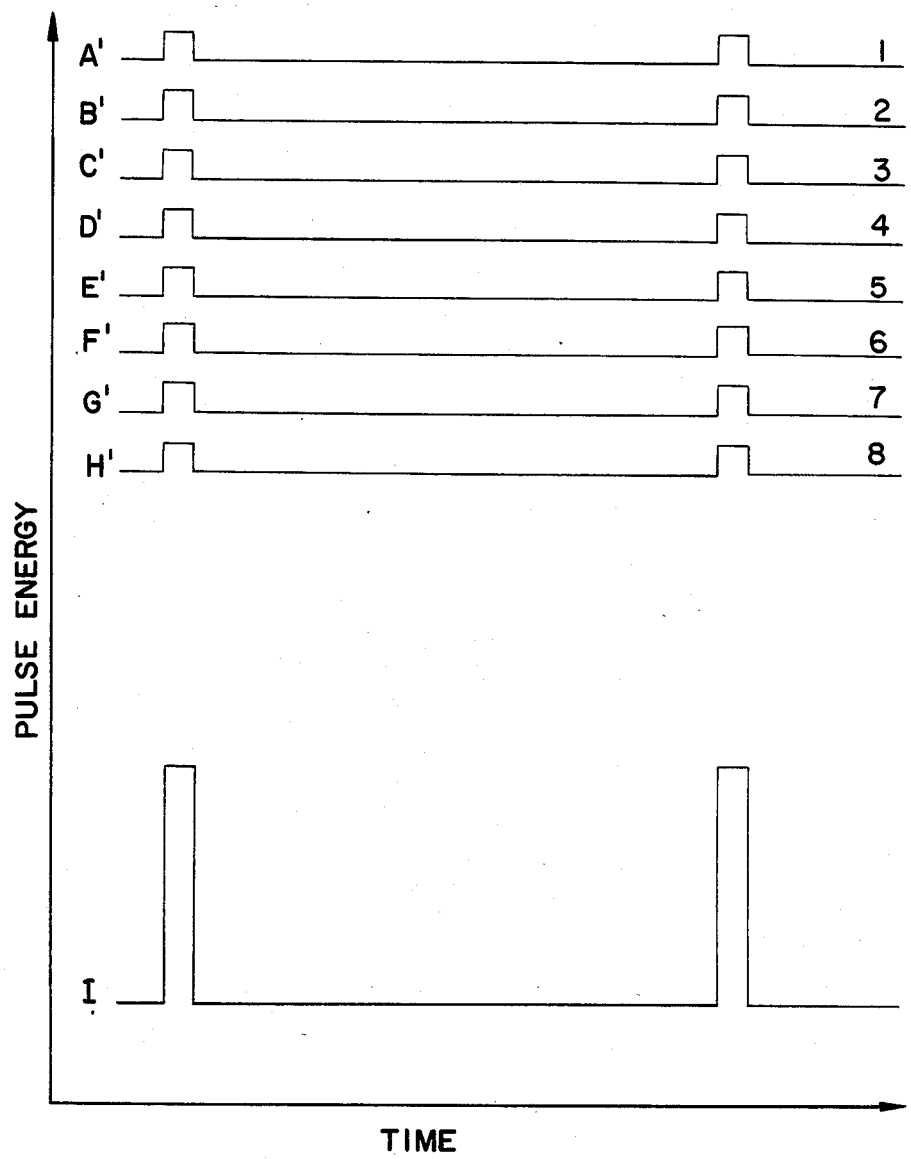
FIG. 4 is a diagram illustrating the optical output from the individual lasers and from the system of FIG. 1 when the individual lasers are fired simultaneously.

Referring now to FIG. 4, there is illustrated the optical output pulses, represented by waveforms A'–H', from the individual lasers of FIG. 1 and the optical output pulse represented by the waveform I' from the system when the controller 52 is arranged to cause the lasers to fire simultaneously. This operation would be highly desirable in applications where a high energy short duration pulse is required. For example, the use of eight (or more) lasers in a single system fired simultaneously, as illustrated in FIG. 4, will produce the required energy for annealing solar cells completely with one firing of each of the lasers with each individual laser designed to produce only one-eighth or less of the total energy required.

Figure 5:
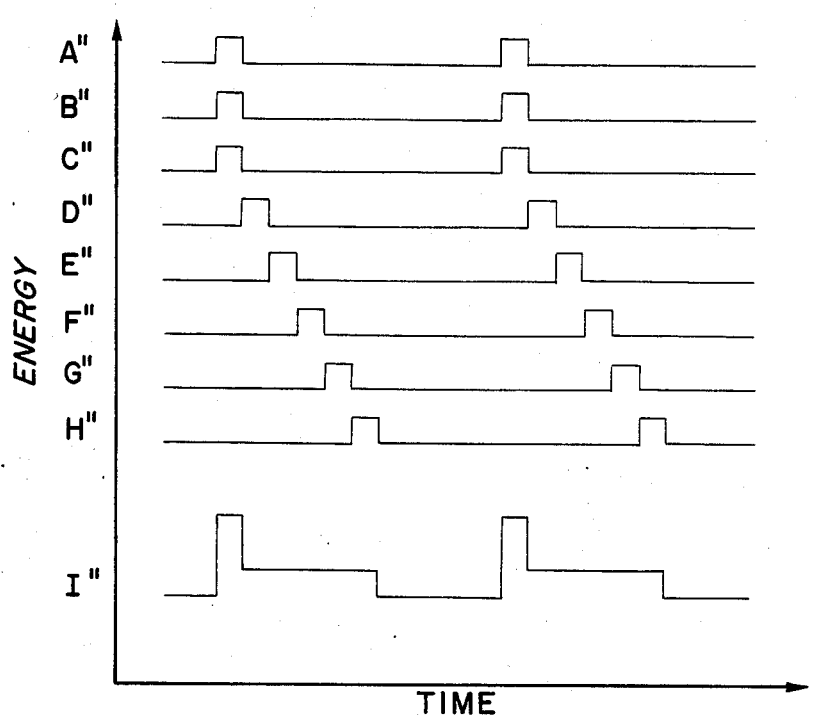
FIG. 5 is a diagram illustrating the optical output from the individual laser and from the system of FIG. 1 when several lasers are fired simultaneously and several lasers are fired in sequence.

Referring now to FIG. 5, there is illustrated the individual optical output waveforms A"–H" from the lasers 12–26, respectively, and the system output (represented by the waveform I") when the controller 52 is arranged to cause lasers 12, 14 and 16 to fire simultaneously and lasers 18, 20, 22, 24 and 26 to fire in sequence thereafter. In this type of operation, the system will generate high peak powers for vaporizing the surface of metals to be drilled or in curing applications with a relatively long pulse of lower power follwing the peak power.

Figure 6:
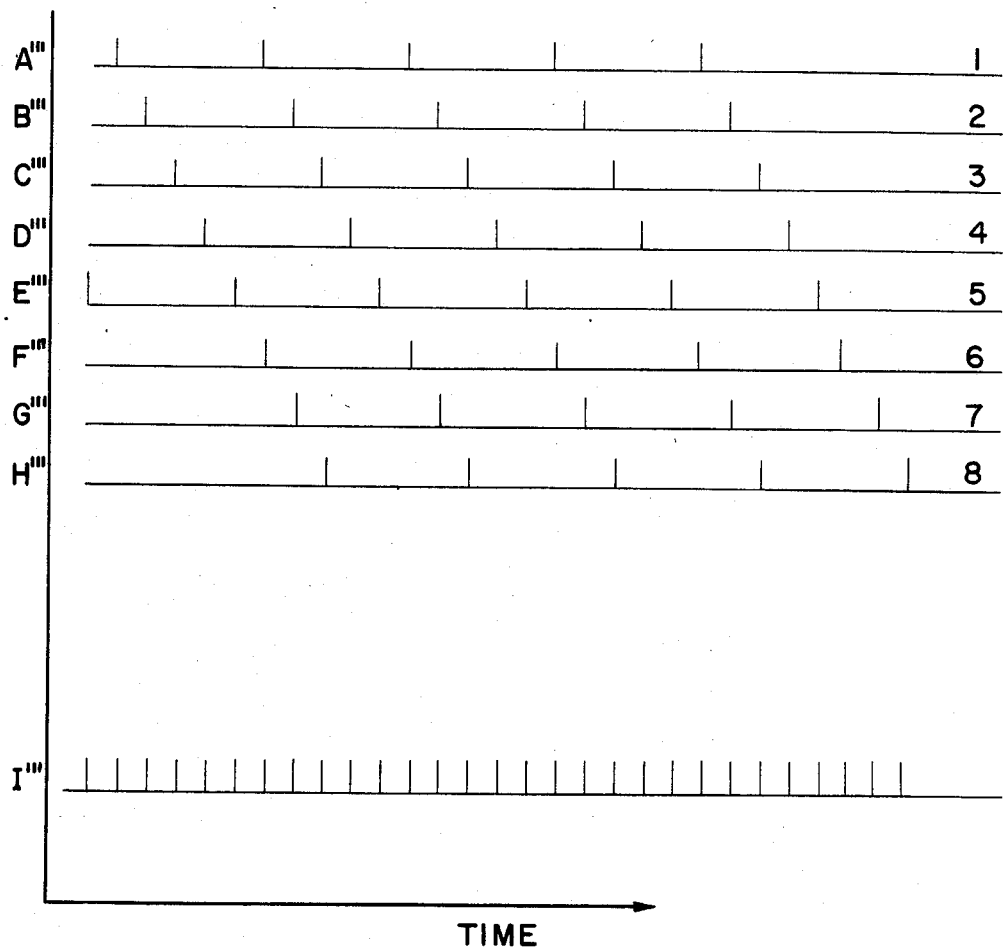
FIG. 6 is a diagram illustrating the optical output from the individual lasers and from the system of FIG. 1 when the lasers are fired in sequence to provide a high repetition rate for the system.

FIG. 6 represents a system operation in which the lasers 12–26 are fired in sequence to provide a system output having eight times the repetition rate of the individual lasers. In FIG. 6, the waveforms A'''–H''' represent the optical output pulses from the lasers 12–26, repsectively, and waveform I''' represents the output pulses from the system. The throughput or cutting rate can be controlled by using either with a combined beam or multiple individually-controlled cutting beams.

Various laser applications may require unique combinations for pulse powers and pulse sequencing to do the job effectively. The multiplex laser system of this invention is much less expensive to manufacture, easier to maintain and more versatile than a single laser for accomplishing similar tasks. Furthermore, if one laser is inoperative, the remaining lasers can still be operative while the inoperative laser is being repaired. Also, the frequency of downtime is less for the system approach than for a single laser because there is a longer time between maintenance periods and part replacement since each of the individual lasers can be run at a lower repetition rate and pulse energy than would be required for a single laser. Also, the use of smaller lasers in the system of our invention utilize smaller optical components than would a large laser, which components are less expensive.

Figure 7:
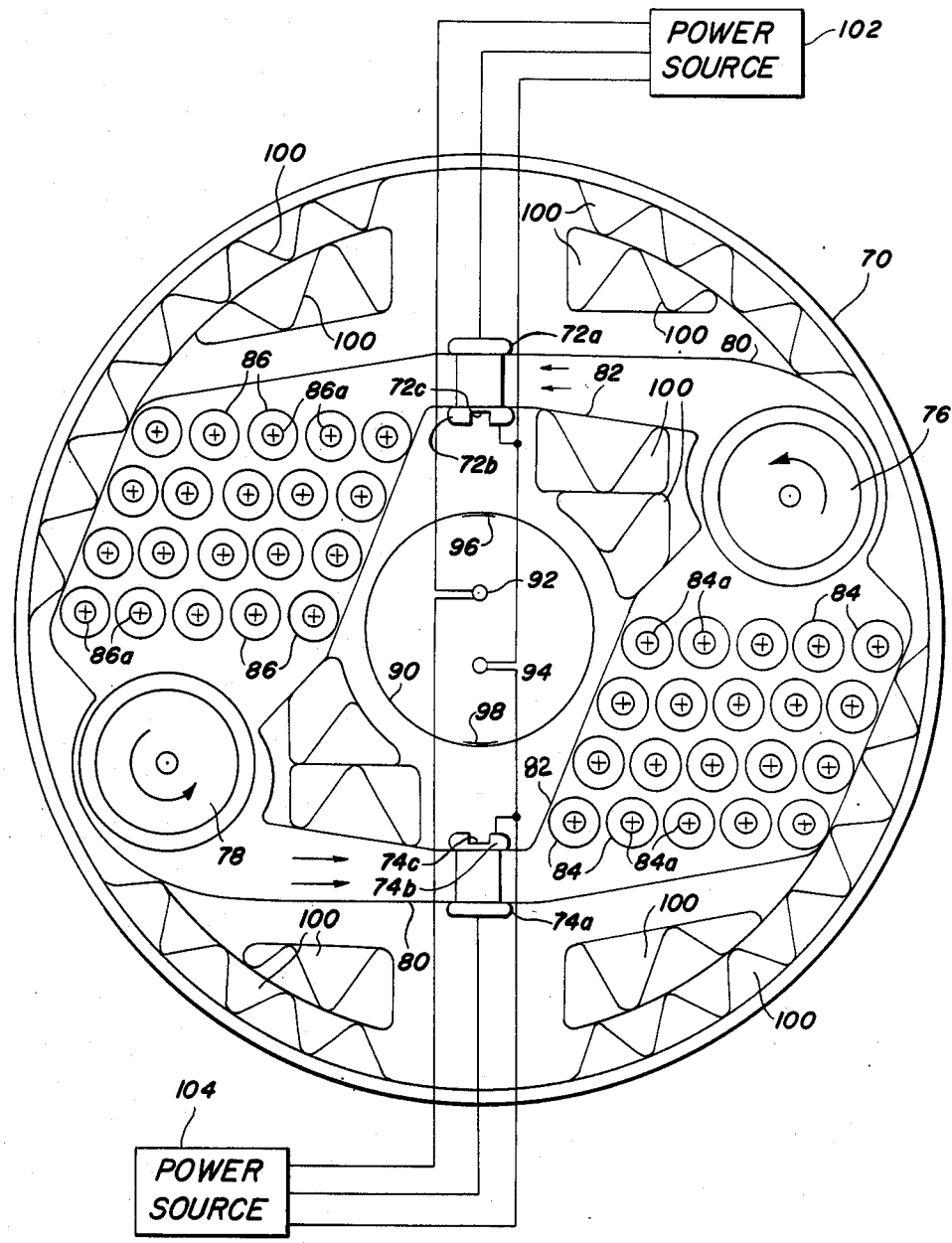
FIG. 7 is a cross-sectional view of a laser provided with two pairs of discharge electrodes in accordance with another embodiment of the invention.

FIG. 7 illustrates a laser tube 70 which houses two pairs of transverse discharge electrodes 72a, 72b, 74a, 74b. The laser gas, such as XeCl, circulates through the electrodes 72a, 72b and 74a, 74b by means of fans 76 and 78 and guides 80 and 82. Heat is removed from the circulating gas by finned tube heat exchangers 84 and 86. Water or another suitable coolant is circulated through the tubes 84a and 86a of the heat exchanger by means of conventional pumps not shown. Two electrodes 72b and 74b (which may be the ground electrodes) include centrally-located thin wall sections 72c and 74c, respectively, through which X-rays pass from an X-ray pre-ionizer 90.

The X-ray pre-ionizer includes a pair of high voltage electrodes 92 and 94 for providing high energy electrons (or ions) for bombarding a pair of metal foil sections 96 and 98. The electron bombardment of the metal foil sections 96 and 98 cause the emission of X-rays, which pass through the thin wall sections or windows 72c and 74c to pre-ionize the gas between the transverse electrodes 72a, 72b and 74a, 74b. Baffles 100 aid in controlling turbulence in the laser gas.

A separate power supply or source 102, 104 for furnishing the excitation energy is connected to each pair of electrodes 72a, 72b and 74a, 74b. High voltage pulses for the pre-ionizer electrodes may be derived from the same power supply that supplies the high energy excitation pulses to the main electrodes 72a, 72b and 74a, 74b, as is well known in the art.

The incorporation of multiple electrode pairs (e.g., 2, 3, 4, etc.) in a single laser tube with a separate power supply for each pair provides the versatility of permitting the production of simultaneous or sequential optical output pulses from the laser while maintaining the power requirements low, conserving space, components, etc. The dual pair electrode laser of FIG. 7 could, for example, be incorporated into the system of FIG. 1 by substituting four lasers having dual electrode pairs for the eight lasers shown in FIG. 1.

Figure 8:
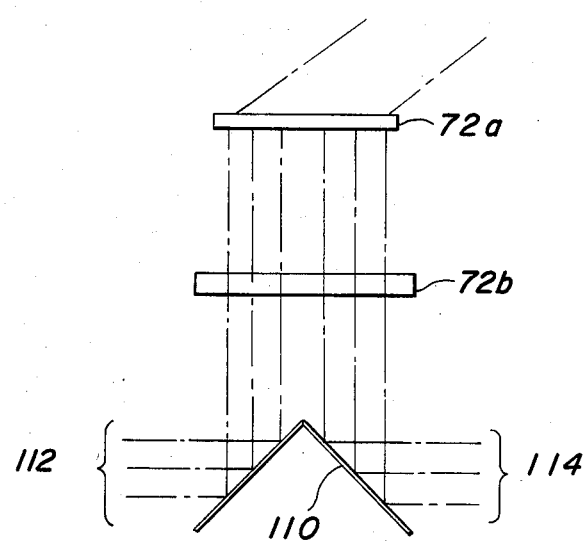
FIG. 8 is a schematic representation of one pair of the electrodes of the laser of FIG. 7 with a mirror arrangement for providing two separate optical output pulses.

Referring to FIG. 8, there is illustrated one of the electrode pairs (72a, 72b) of the laser of FIG. 7 in which a mirror 110 is provided to split the optical output pulses into two beams 112 and 114. The separate beams can be used, for example, to provide two separate cutting operations where the energy required for a single cutting operation is one-half or less than present in the output from a single discharge.

There has thus been described a versatile multiplex electric discharge gas laser system which is capable of providing the required energy per pulse, average power and repetition rate for many different tasks. Various modifications of the system will be apparent to those skilled in the art without departing from the spirit and scope of the invention, as set forth in the appended claims.

What is claimed is:

1. A multiplex pulsed electric discharge gas laser system comprising:
   (a) a housing;
   (b) a plurality of pulsed electric transverse discharge gas lasers supported in the housing, each laser being arranged to produce a separate optical output;
   (c) a separate power supply individually associated with each laser for providing high energy excitation pulses to the associated laser to cause the laser to produce an optical output;
   (d) control means coupled to each power supply for controlling the application of excitation pulses to each laser, whereby the lasers can be fired simultaneously or in a desired sequence and at a desired repetition rate, and the resulting multiple optical output beams can be combined or utilized separately.

2. The laser system of claim 1 wherein the control means is arranged to cause the individual power supplies to apply excitation pulses to the respective lasers in a sequential manner to provide output pulses from the laser system at a repetition rate of n times the repetition rate of the operation of each laser, where n equals the number of individual lasers in the housing.

3. The laser system of claim 1 wherein the control means is arranged to cause the individual power supplies to apply excitation pulses to more than one laser at a time to thereby increase the light energy emitted by the laser system during such times over the light energy contributed by a single laser.

4. The laser system of claim 1 wherein the control means is arranged to apply excitation pulses to the lasers in a predetermined pattern so that at least two lasers are fired simultaneously and at least one additional laser is fired in sequence thereafter.

5. The laser system of claim 1 wherein each laser includes multiple pairs of discharge electrodes with a separate power supply connected to each pair of discharge electrodes, whereby each separate pair of discharge electrodes can be fired independently of the other electrode pairs.

6. The laser system of claim 5 including optical means associated with each electrode pair to split the optical output therefrom into multiple beams.

7. In a multiplex electric discharge gas laser system, the combination which comprises:
   (a) a housing;
   (b) at least one excimer laser supported in the housing, the lasers having n pairs of discharge electrodes, where n is an integer;
   (c) a high voltage power supply individually associated with each pair of discharge electrodes, each power supply having a high voltage output circuit connected to its associated electrode pair and a control circuit and being responsive to the application of a control signal to the control circuit thereof for applying a high voltage excitation pulse to the associated electrode pair to produce an optical output pulse from said electrode pair; and
   (d) a controller connected to the control circuit of each power supply for applying control signals thereto, whereby the individual pairs of discharge electrodes may be fired sequentially, in parallel or in any desired combination.

8. The laser system of claim 7 wherein the controller is arranged to apply the control signals so that the electrode pairs are fired sequentially.

9. The laser system of claim 7 wherein the controller is arranged to apply the control signals so that the electrode pairs are fired simultaneously.

10. The laser system of claim 7 wherein n is greater than two and wherein the controller is arranged to apply the control signals so that at least two electrode pairs are fired simultaneously and at least one electrode pair is fired in sequence thereafter.

11. The laser system of claim 7 wherein the housing supports multiple lasers and each laser includes at least two pairs of discharge electrodes.

12. The laser system of claim 11 including means for splitting the optical output from each electrode pair into multiple beams.

13. In a multiplex electric discharge gas laser system, the combination which comprises:
   a container for holding an excimer gas;
   a plurality of pairs of transverse discharge electrodes supported within the container, each pair comprising two spaced electrodes;
   means for circulating the gas between each electrode pair;
   heat exchange means disposed in the flow path of the circulating gas for removing heat therefrom;
   power supply means individually connected across each pair of electrodes for providing high energy excitation pulses across the associated electrode pair to cause the laser gas therebetween to emit light energy; and
   control means coupled to each power supply means for controlling the application of excitation pulses to each electrode pair, whereby the light energy emitted from the discharge between the pairs of electrodes may be controlled to occur simultaneously or in any desired sequence.

14. The laser system of claim 13 wherein two pairs of elecrtrodes are included in the container.

15. The laser system of claim 13 including means for splitting the light output from at least one electrode pair into multiple light beams.

16. The laser system of claim 15 wherein said last-named means is arranged to split the light output into two beams.

* * * * *